United States Patent
Kiyosawa et al.

[11] Patent Number: 6,065,362
[45] Date of Patent: May 23, 2000

[54] SEALED-TYPE WAVE GEAR DEVICE

[75] Inventors: Yoshihide Kiyosawa; Kazuo Tanaka, both of Nagano-ken, Japan

[73] Assignee: Harmonic Drive Systems, Inc., Tokyo, Japan

[21] Appl. No.: 08/907,878

[22] Filed: Aug. 11, 1997

[51] Int. Cl.[7] ........................................ F16H 1/32
[52] U.S. Cl. ............................................. 74/460
[58] Field of Search ................................. 74/460

[56] References Cited

U.S. PATENT DOCUMENTS

| | | | |
|---|---|---|---|
| 4,770,059 | 9/1988 | Beyer | 74/640 |
| 4,909,098 | 3/1990 | Kiryu | 74/640 |
| 5,195,401 | 3/1993 | Mouton | 74/606 R |
| 5,388,483 | 2/1995 | Ishida et al. | 74/640 |
| 5,715,732 | 2/1998 | Takizawa et al. | 74/640 |
| 5,775,178 | 7/1998 | Asawa et al. | 74/640 |

FOREIGN PATENT DOCUMENTS

| | | |
|---|---|---|
| 59-166747 | 9/1984 | Japan . |
| 3-134345 | 6/1991 | Japan . |
| 3-118346 | 12/1991 | Japan . |
| 7-120957 | 5/1995 | Japan . |

*Primary Examiner*—David A. Bucci
*Assistant Examiner*—William C Joyce
*Attorney, Agent, or Firm*—Burns, Doane, Swecker & Mathis LLP

[57] ABSTRACT

A sealed-type wave gear device 1 has a sealed space 13 formed by a device housing 2, first and second end plates 3 and 4 placed in openings at both the ends thereof, a hollow Input shaft 5, and first to fourth seals (8, 9, 11, 12) for sealing these members. A flat wave gear mechanism 20 is accommodated in the sealed space 13, which comprises a rigid internal gear 210, a silk-hat-shaped flexible external gear 220 inside the rigid internal gear 210, and a wave generator 230 fixed inside the flexible external gear 220. A lubricant in the wave gear mechanism 20 is completely prevented from leaking outside. Only the device housing 2, the first and second end plates 3 and 4, and both the ends of the input shaft 5 which are exposed outside need to be protected from rusting. The wave gear device 1 is suitable for being used as a speed reduction unit of a driving mechanism employed in a clean room.

6 Claims, 1 Drawing Sheet

SEALED-TYPE WAVE GEAR DEVICE

BACKGROUND OF THE INVENTION

1. Technical Field

The present invention relates to a wave gear device, and more particularly to a sealed-type wave gear device appropriate for being used as a drive mechanism in a clean room and the like.

2. Description of the Related Art

There have been known wave gear devices provided with a flexible external gear having a shape of ring or a, cup or a silk hat. For example, the inventors of the present invention disclosed a wave gear device of the type having a flexible external gear in order to shorten the axial size of the device in Japanese Patent application Nos. HEI 6-310834 and HEI 6-310835, both assigned to the same assignee of the present invention.

The inventors of the present invention also disclosed a flat wave gear device constituted to have a structure suitable for adopting the aforementioned flexible external gear in Japanese Patent Application No. HEI 7-120957, assigned to the same assignee of the present invention.

SUMMARY

An object of this invention is to provide a sealed-type wave gear device utilizing a flat wave gear mechanism proposed by the present inventors.

Another object of the invention is to provide a simple sealed-type wave gear device utilizing a flat wave gear mechanism.

Still another object of the invention is to provide a sealed-type wave gear device utilizing a flat wave gear mechanism, which can be adopted in a drive mechanism used in a clean room and the like.

In order to realize the above object, the sealed-type wave gear device according to this invention comprises a tubular device housing; a first end plate placed at a first open end on one side of the device housing; a second end plate placed at a second open end on the other side of the device housing; an input shaft which is coaxially placed inside the device housing and whose ends are rotatably supported by the first and second end plates respectively; a first sealing means for sealing the first open end and the first end plate; a second sealing means for sealing the second open end and the second end plate; a third sealing means for sealing the first end plate and the input shaft; a fourth sealing means for sealing the second end plate and the input shaft; and a wave gear mechanism accommodated in a sealed space defined by the device housing, the first and second end plates, and the first to fourth sealing means.

According to this invention, since the wave gear mechanism is placed in the sealed space, a lubricant supplied thereto does not leak outside.

In general, a wave gear mechanism must be rust-prevented so as not to rust on its periphery when it is placed in a clean room and the like. Each of the components of the wave gear mechanism according to the present invention is assembled in the sealed space, and therefore there is no need for rust prevention. Only the surfaces exposed outside of the device housing, the first and second end plates, the input shaft and fastening bolts and the like composing the sealed space need to be rust-prevented, In a preferred embodiment of the invention, the wave gear mechanism can be adopted which has a flexible external gear having a tubular body, external teeth formed on an outer periphery of an open end on a side of the first end plate of the body, an annular diaphragm extending outward and radially from an open end on a side of the second end plate of the body, and a thick annular boss extending from an outer peripheral edge of the diaphragm; an annular rigid internal gear placed around the external gear which has internal tooth formed on an inner periphery thereof and capable of meshing with the external teeth; and a wave generator which is placed inside a portion of the tubular body where the external teeth are formed and which deforms the tubular body radially to mesh the external teeth partially with the internal teeth and moves meshed portions of the teeth circumferentially.

In this case, the input shaft is arranged penetrating through and fixedly mounted on the wave generator.

The rigid internal gear and the flexible external gear are supported by a bearing mechanism so as to rotate relative to each other. The bearing mechanism may be placed on the outer periphery of the tubular body of the flexible external gear, wherein an outer race of the bearing may be fixed on the device housing, the annular boss and the second end plate, while an inner race thereof may be fixed on the rigid internal gear and the first end plate.

A cross roller bearing may be employed as the bearing. In this case, the annular boss of the flexible external gear and the outer race of the cross roller bearing are placed between the second end plate and an annular stop formed on the inner periphery of the device housing, and these four members are fastened together in this condition. The rigid internal gear is placed between an annular end surface of the inner race of the cross roller bearing and an annular end surface inside the first end plate, and these three members are fastened together in this condition.

On the other hand, the first sealing means is provided for sealing the device housing and the first end plate in a manner allowing relative rotation thereof. A magnetic seal can be employed for this sealing means.

The input shaft of a hollow type can be employed, wherein since component members such as wires can be located in the hollow portion of the shaft, layout of the device can be designed more freely.

DETAILED DESCRIPTION OF THE PREFERRED EMBODIMENT

Figure 1:
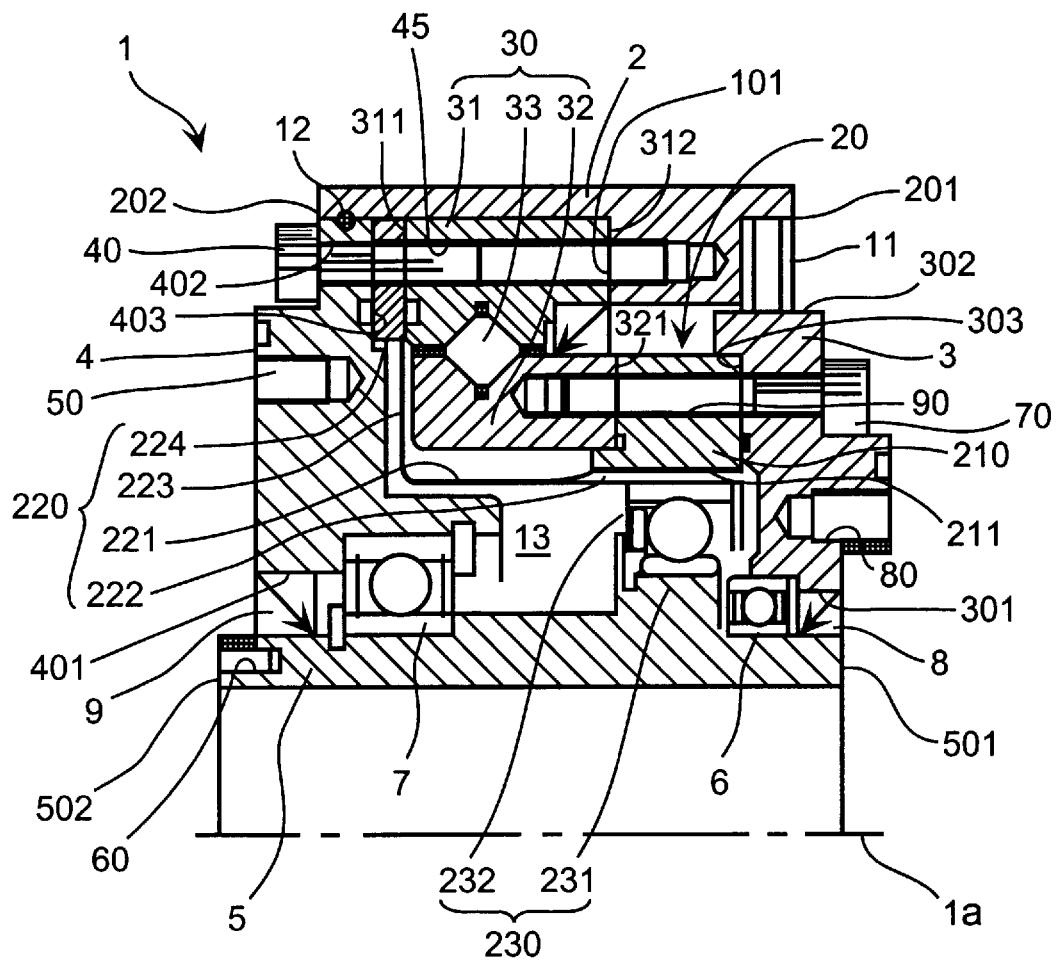
FIG. 1 is a sectional view in half portion of a sealed-type wave gear device according to this invention cut along the device axial line.

Now an example of this invention will be described with reference to FIG. 1.

A sealed-type wave gear device 1 according to this invention is provided with a device housing 2 of tubular shape having open ends 201 and 202. A first end plate 3 is placed on the one open end 201 (a first open end) and a second end plate 4 is on the other open end 202 (a second open end), inside the device housing 2, a hollow input shaft 5 is placed coaxially in a direction of a device axial line 1$a$. A first end portion 501 of the hollow input shaft 5 is located in a hole 301 in the first end plate 3, and the outer periphery thereof rotatably supports the first end plate 3 via a ball bearing 6. A second end portion 502 of the hollow input shaft 5 penetrates a hole 401 in the second end plate 4 and projects out, and the outer periphery thereof rotatably supports the second end plate 4 via a ball bearing 7.

An oil seal 8 (a third sealing means) is attached outside the ball bearing for sealing the inner periphery of the first and plate 3 and the outer periphery of the first and portion 501 of the hollow input shaft 5. Similarly, an oil seal 9 (a fourth sealing means) is attached outside the ball bearing 7 for sealing the inner periphery of the second end plate 4 and the outer periphery of the second end portion 502 of the hollow input shaft 5. On the other hand, a magnetic seal 11 (a first sealing means) is attached between the outer periphery 302 of the first end plate 3 and the inner periphery of the open end 201 of the device housing 2 in order for their sealing. An O ring 12 (second sealing means) is attached between the outer periphery 402 of the second end plate 4 and the inner periphery of the open end 202 of the device housing 2 in order for their sealing.

Accordingly, a sealed space 13 having generally an annular shape is defined by the device housing 2, the hollow input shaft 5, the left and right end plates 3 and 4, and the first to fourth sealing means 8–12. The sealed-type wave gear device 1 is provided in the sealed space 13 with a wave gear mechanism 20 having the following structure, The wave gear mechanism 20 of the device 1 comprises an annular rigid internal gear 210, a flexible external gear 220, and a wave generator 230. In the industry, the shape of the external gear is referred to as silk-hat-shaped. The flexible external gear 220 has a tubular body 221, external teeth 222 formed on the outer periphery of one open end of the body 221, an annular diaphragm 223 extending from the other open end of the body 221 and extending outward at a right angle along a radial direction, and a thick annular boss 224 extending from the outer peripheral edge of the diaphragm 223. The rigid internal gear 210 is placed around the external teeth 222, and is formed on the inner periphery thereof with internal teeth 211 capable of meshing with the external teeth 222. The wave generator 230 is fitted inside a portion of the body 221 where the external teeth 222 are formed.

The wave generator 230 has a rigid cam plate 231 whose contour is elliptical, and a wave bearing 232 placed on the outer periphery of the cam plate 231. In this example, the rigid cam plate 231 is integrally formed on the outer periphery of the hollow input shaft 5. It goes without saying that a rigid cam plate manufactured as a separate member may be fixedly mounted on the outer periphery of the input shaft 5. The body portion of the flexible external gear 220 where the external teeth 222 are formed is deformed in the shape of ellipse by the wave generator 230 so as to mesh with the internal teeth 211 at both the ends thereof in a major axial direction. The wave generator 230 rotates as the hollow input shaft 5 rotates, and accordingly the mashed positions of the external teeth 222 and the internal teeth 221 move in a circumferential direction. Generally, the teeth number of the external teeth 222 is fewer by two than that of the internal teeth 211, and as the meshed positions move in a circumferential direction, relative rotation reduced much more greatly than input rotation is generated between the external and internal gears. The rotation can be transmitted from the internal gear or the external gear. Since the reduction principle is well known, the detailed explanation thereof will be omitted here.

A cross roller bearing 30 is placed between the second end plate 4 and the rigid internal gear 210 along the axial line 1a and is placed between the outer periphery of the body 221 of the flexible external gear 220 and the inner periphery of the device housing 2 along the radial direction. The cross roller bearing 30 comprises an outer race 31, an inner race 32, and rollers 33 placed rotatably in an annular groove between these races in a manner that they alternately cross one by one circumferentially.

In this example, an annular boss 224 of the flexible external gear 220 is hold between an annular end surface 311 of the outer race 31 of the cross roller bearing 30 and an inside end surface 403 of the second end plate 4. The other annular end surface 312 of the outer race 31 abuts against an annular step 101 for bearing the outer race formed on the inner periphery of the device housing 2. In these four members, a plurality of fastening bolt holes 45 are formed extending from the second end plate 4 along the device axial line 1a at a prescribed angular interval in a circumferential direction, and the four members are fastened by fastening bolts 40 fixed in each of the bolt holes 45, The second end plate 4 is also formed therein with a plurality of attachment bolt holes 50 extending from the end surface thereof along the device axial line 1a. These attachment bolt holes 50 can be used when the side of the second end plate 4 and the device housing 2 is fixedly mounted on the side of a motor case and the like. Similarly, the hollow input shaft 50 is formed on its annular and surface of the second end portion 502 with a plurality of connection bolt holes 60 extending along the device axial line 1a, and making use of these connection bolt holes 60, the hollow input shaft 5 can be connected to a high-speed rotational axis (not shown) of a motor output shaft and the like.

On the other hand, the rigid internal gear 210 is held between an annular end surface 321 of the inner race 32 of the cross roller bearing 30 and an so annular end surface 303 of the first end plate 3 facing the end surface 321. These three members are formed with a plurality of fastening bolt holes 80 extending from the first end plate 3 along the device axial 1a, and are fastened together by means of fastening bolts 70 fixed in the bolt holes 90.

The first end plate 3 is also formed with a plurality of attachment bolt holes 80 extending from its outer end surface along the device axial line 1a, and making use of those attachment bolt holes 80, the side of the first end plate 3 can be fixed on the load side and the like.

The sealed-type wave gear device 1 of the present example is assembled such that the side of the second end plate 4 thereof is connected to the stationary side of the motor case and the like, while the side of the other first end plate 3 is connected to and fixed on a member on the load side to be rotated at a reduced speed. Further, the second and portion 502 of the hollow input shaft 5 is connected to the motor output shaft and the like. As the hollow input shaft 5 rotates, relative rotation is generated between the flexible external gear 220 and the rigid internal gear 210, in this example, since the side of the rigid internal gear 210 is connected to the stationary side, namely the device housing 2 and the second and plate 4, the other side of the first end plate 3 rotates at a reduced speed and the rotation thereof is transmitted to the load side.

As described above, in the sealed-type wave gear device 1 of this example, the tubular device housing 2, the first and second end plates at the open ends on both the sides of the housing 2, the hollow input shaft 5, and the first to fourth sealing means 8, 9,11 and 12 sealing these form the sealed space 13, in which the wave gear mechanism 20 is accommodated. Accordingly, a lubricant for lubricating each portion of the wave gear mechanism 20 does not leak outside. Further, since only the device housing 2, the first and second end plates, and the input shaft 5 are exposed outside, only the exposed surfaces of these members need to be rust-prevented. Hence, the sealed-type wave gear device 1 of this example is appropriate for being used as a speed reduction unit of a drive mechanism provided in a place such as a clean room, where it is required to completely prevent scattering of a lubricant, generation of rust, and the like.

In addition, since the wave gear mechanism 20 of this example is simple in structure and flat in shape having a shorter axial length, the overall structure of the wave gear device can be made compact and flat.

Moreover, the wave gear device 1 is provided with the hollow input shaft 5, which is advantageous in that wires and other members can be placed in a hollow portion of the hollow input shaft 5.

Instead of the cross roller bearing 30 employed in this example, a ball bearing may be used. Further, in this example, the second end plate 4 and the device housing 2 are produced as separate members, and fastened by the fastening bolts 40. Alternatively, the second end plate 4 and the device housing 2 may be integrally formed. For convenience' sake, these members are described separately here; but needless to say, these members may be integrally manufactured. Furthermore, It goes without saying that a solid input shaft may be used instead of the hollow input shaft employed in the above example.

As described above, the sealed-type wave gear device according to this invention has the tubular device housing, the first and second end plates placed at both the ends thereof, the input shaft, and the first to fourth sealing means for sealing these members, whereby the sealed space is defined and the wave gear mechanism is accommodated in the sealed space. Therefore, the gear device according to this invention is appropriate to being used as a so speed reduction unit and the like in a drive mechanism employed in a clean room and so on.

What is claimed is:

1. A sealed wave gear device comprising:

a tubular housing;

a first end plate placed at a first open end on one side of the device housing;

a second end plate placed at a second open end on the other side of the device housing;

an input shaft which is coaxially placed inside the tubular housing and whose ends are rotatably supported by the first and second end plates respectively;

a first sealing means for sealing the tubular housing to the first end plate;

a second sealing means for sealing the tubular housing to the second end plate;

a third sealing means for sealing the first end plate to the input shaft;

a fourth sealing means for sealing the second end plate to the input shaft;

a wave gear mechanism including a rigid internal gear and a flexible external gear; and a bearing for supporting the rigid internal gear and the external gear so that they are rotatable relative to each other, an outer ring of the bearing is connected to the flexible external gear and an inner ring of the bearing is connected to the rigid internal gear;

wherein the wave gear mechanism and the bearing are completely accommodated in a sealed space defined by the tubular housing, the first and second end plates, and the first to fourth sealing means, wherein the outer ring of the bearing is distinct from and internal to the tubular housing and the outer ring is secured to the tubular housing with a fastener.

2. A sealed wave gear device according to claim 1, wherein the flexible external gear has a tubular body, external teeth formed on an outer periphery of an open end on a side of the first end plate of the body, an annular diaphragm extending outward and radially from an open end on a side of the second end plate of the body, and a thick annular boss extending from an outer peripheral edge of the diaphragm;

the annular rigid internal gear is placed around the external gear, the internal gear has internal teeth formed on an inner periphery thereof meshing with the external teeth; and the wave gear mechanism further includes a wave generator which is placed inside a portion of the tubular body where the external teeth are formed and which deforms the tubular body radially to partially mesh the external teeth with the internal teeth and moves meshed portions of the teeth circumferentially, and wherein the input shaft is arranged penetrating through and fixedly mounted on the wave generator.

3. A sealed-type wave gear device according to claim 2, wherein the bearing is a cross roller bearing, and wherein the annular boss of the flexible external gear and the outer race of the cross roller bearing are placed between the second end plate and an annular stop formed on the inner periphery of the device housing, and these four members are fastened together in this condition, while the rigid internal gear is placed between an annular end surface of the inner race of the cross roller bearing and an annular end surface inside the first end plate, and these three members are fastened together in this condition.

4. A sealed-type wave gear device according to claim 3, wherein said first sealing means is a magnetic seal.

5. A sealed wave gear device according to claim 1, wherein the input shaft is hollow and has both ends passing through the first and second end plates, respectively.

6. A sealed wave gear device according to claim 1, wherein the bearing is placed on an outer periphery of a tubular body of the flexible external gear, and the outer ring of the bearing is also fixed to the tubular housing and the second end plate, and the inner ring of the bearing is also fixed to the first end plate.

* * * * *